(12) United States Patent
Metzler

(10) Patent No.: US 10,946,350 B2
(45) Date of Patent: Mar. 16, 2021

(54) MIXING DEVICE FOR MIXING A LIQUID PLASTICS COMPONENT WITH A GAS

(71) Applicant: Henkel AG & Co. KGaA, Düsseldorf (DE)

(72) Inventor: Mario Metzler, Lustenau (AT)

(73) Assignee: HENKEL AG & CO. KGAA, Düsseldorf (DE)

( * ) Notice: Subject to any disclaimer, the term of this patent is extended or adjusted under 35 U.S.C. 154(b) by 248 days.

(21) Appl. No.: 15/735,802

(22) PCT Filed: Jun. 24, 2016

(86) PCT No.: PCT/AT2016/050227
§ 371 (c)(1),
(2) Date: Dec. 12, 2017

(87) PCT Pub. No.: WO2017/004636
PCT Pub. Date: Jan. 12, 2017

(65) Prior Publication Data
US 2019/0314776 A1   Oct. 17, 2019

(30) Foreign Application Priority Data
Jul. 3, 2015   (AT) .................................. A 433/2015

(51) Int. Cl.
*B01F 7/16* (2006.01)
*B01F 15/00* (2006.01)
(Continued)

(52) U.S. Cl.
CPC ............ *B01F 7/16* (2013.01); *B01F 3/04531* (2013.01); *B01F 15/00681* (2013.01);
(Continued)

(58) Field of Classification Search
None
See application file for complete search history.

(56) References Cited

U.S. PATENT DOCUMENTS 2,685,436 A * 8/1954 Hasselquist ......... B01F 13/1025
366/104
2,995,346 A   8/1961 Samples
(Continued)

FOREIGN PATENT DOCUMENTS

CN   1045056   9/1990
CN   1658959   8/2005
(Continued)

OTHER PUBLICATIONS

Search Report dated Mar. 29, 2019 in Chinese Patent Application No. 201680038086.4.
(Continued)

*Primary Examiner* — Jennifer A Leung

(57) ABSTRACT

A mixing device for mixing a liquid plastics component with a gas, includes a liquid feed, a gas feed, and a discharge opening for discharging the mixture generated in the mixing device. Each of the liquid feed, gas feed, and discharge opening is connected to a mixing chamber in which a rotatable agitator device is arranged. A shaft for driving the agitator device projects out of the mixing chamber, and the mixing chamber is sealed off, in the region of the shaft, by a seal. On that side of the seal which is averted from the mixing chamber, there is a reservoir which is connected to the liquid feed and which is connected by a passage to the mixing chamber.

7 Claims, 1 Drawing Sheet

(51) Int. Cl.
    *B29B 7/74*          (2006.01)
    *B01F 3/04*          (2006.01)
    *B01F 15/06*        (2006.01)

(52) U.S. Cl.
    CPC .......... *B01F 15/065* (2013.01); *B29B 7/7414* (2013.01); *B01F 2015/00097* (2013.01); *B01F 2015/00103* (2013.01); *B01F 2015/061* (2013.01); *B01F 2215/0049* (2013.01)

(56) References Cited

U.S. PATENT DOCUMENTS

| | | | |
|---|---|---|---|
| 3,164,420 A * | 1/1965 | Cramer, Jr. | F16J 15/40 277/350 |
| 3,362,919 A * | 1/1968 | Rood | B29C 44/365 521/131 |
| 3,902,850 A | 9/1975 | Lehnert | |
| 3,924,836 A | 12/1975 | Bruning et al. | |
| 3,962,120 A * | 6/1976 | Chiocchio | B29B 7/7409 422/133 |
| 4,486,102 A | 12/1984 | Thiele et al. | |
| 4,590,030 A | 5/1986 | Gillner et al. | |
| 4,977,711 A | 12/1990 | Prignitz | |
| 5,207,047 A | 5/1993 | Prignitz | |
| 5,874,031 A | 2/1999 | Okuda et al. | |
| 5,984,280 A | 11/1999 | Okuda et al. | |
| 6,538,040 B1 | 3/2003 | Okuda et al. | |
| 6,725,887 B2 | 4/2004 | Kopp | |
| 6,860,289 B2 | 3/2005 | Villwock et al. | |
| 6,884,823 B1 | 4/2005 | Pierick et al. | |
| 6,994,464 B2 | 2/2006 | Villwock et al. | |
| 7,029,162 B2 | 4/2006 | Villwock et al. | |
| 7,338,980 B2 | 3/2008 | Okuda et al. | |
| 7,361,294 B2 | 4/2008 | Pierick et al. | |
| 8,137,600 B2 | 3/2012 | Pierick et al. | |
| 9,289,732 B2 | 3/2016 | Helbing et al. | |
| 9,731,257 B2 | 8/2017 | Metzler et al. | |
| 2002/0132859 A1 | 9/2002 | Okuda et al. | |
| 2003/0164201 A1 | 9/2003 | Kopp | |
| 2003/0227817 A1 | 12/2003 | Martel et al. | |
| 2003/0227818 A1 | 12/2003 | Villwock et al. | |
| 2003/0227819 A1 | 12/2003 | Villwock et al. | |
| 2003/0233937 A1 | 12/2003 | Martel | |
| 2004/0020540 A1 | 2/2004 | Villwock et al. | |
| 2005/0029304 A1 | 2/2005 | Okuda et al. | |
| 2005/0163881 A1 | 7/2005 | Pierick et al. | |
| 2005/0237853 A1 | 10/2005 | Martel et al. | |
| 2006/0035988 A1 | 2/2006 | Pierick et al. | |
| 2006/0104156 A1 | 5/2006 | Villwock et al. | |
| 2008/0050576 A1 | 2/2008 | Pierick et al. | |
| 2009/0080283 A1 | 3/2009 | Cutri | |
| 2012/0069697 A1 | 3/2012 | Cutri | |
| 2013/0272088 A1 | 10/2013 | Helbing et al. | |
| 2015/0078113 A1 | 3/2015 | Gillis et al. | |
| 2015/0109878 A1 | 4/2015 | Metzler et al. | |

FOREIGN PATENT DOCUMENTS

| | | |
|---|---|---|
| CN | 2846095 | 12/2006 |
| CN | 101111203 | 1/2008 |
| CN | 203916480 | 11/2014 |
| CN | 203919429 | 11/2014 |
| DE | 1 158 480 | 12/1963 |
| DE | 1 504 654 | 5/1969 |
| DE | 10 2012 103 885 | 11/2013 |
| EP | 0 090 257 | 10/1983 |
| EP | 0 776 745 | 6/1997 |
| EP | 1 512 509 | 3/2005 |
| JP | 58-175637 | 10/1983 |
| JP | 58-199126 | 11/1983 |
| JP | 60-71205 | 4/1985 |
| JP | 2015-517399 | 6/2015 |
| RU | 2195361 | 12/2002 |
| SU | 917856 | 4/1982 |
| SU | 1512647 | 10/1989 |
| WO | 2012/084546 | 6/2012 |
| WO | 2015/059759 | 4/2015 |

OTHER PUBLICATIONS

International Search Report dated Sep. 27, 2016 in International (PCT) Application No. PCT/AT2016/050227.

Search Report dated Feb. 12, 2016 in Austrian Application No. A 433/2015, with English translation.

* cited by examiner

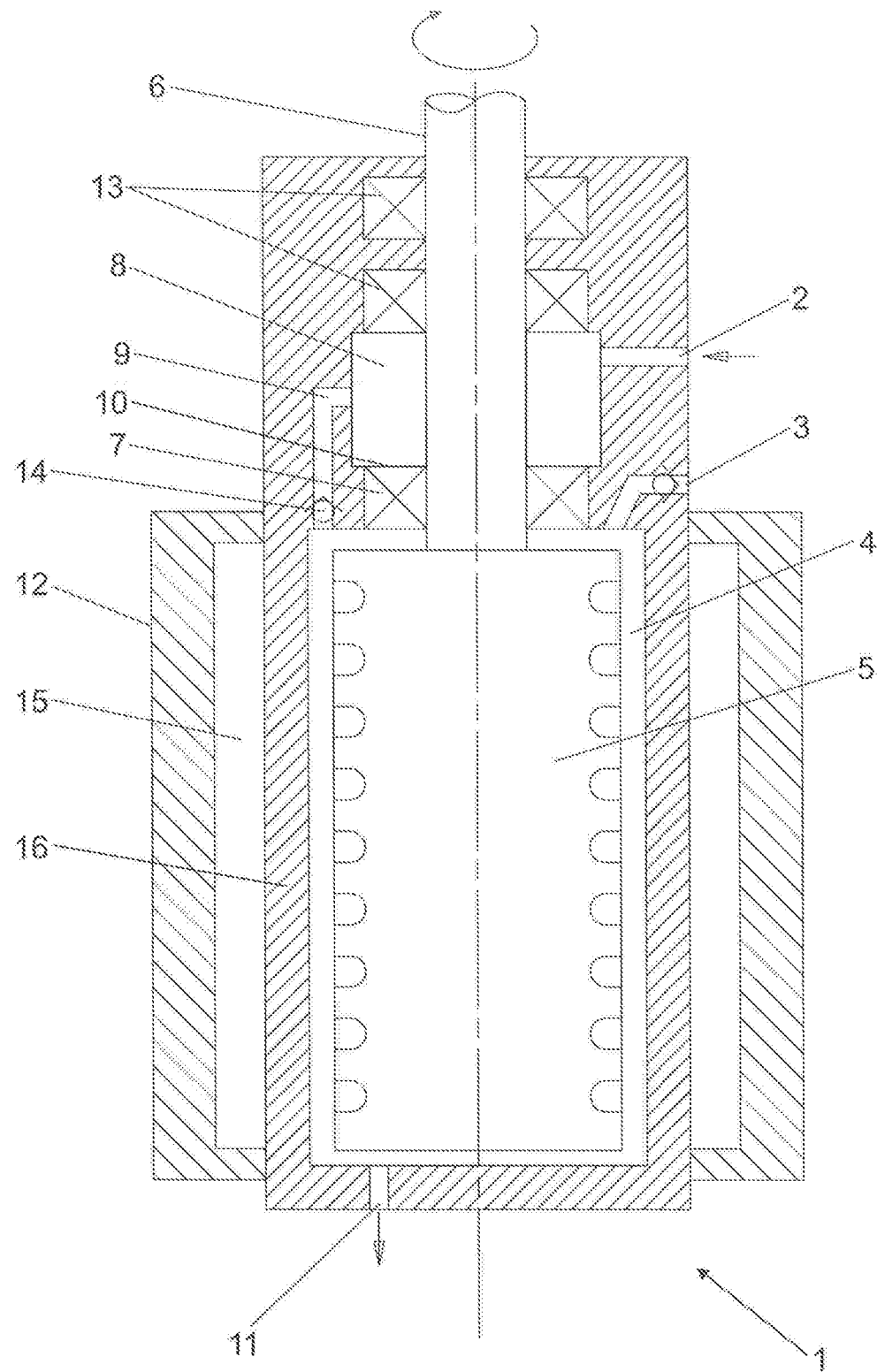

MIXING DEVICE FOR MIXING A LIQUID PLASTICS COMPONENT WITH A GAS

BACKGROUND OF THE INVENTION

The invention concerns a mixing device for mixing a liquid plastics component with a gas.

Mixing devices of the general kind set forth (see, for example, EP 0 776 745 B1) serve for producing a mixture of a liquid plastics component and a gas, wherein the mixture is under a pressure above atmospheric pressure. The gas is homogeneously distributed by the agitator device at least for the major part in the liquid plastics component. When that mixture is discharged from the discharge opening a pressure drop occurs after passing through components which are usual in the state of the art (at least a metering pump and a valve device), the gas causes the liquid plastics component to foam and after hardening of the foamed plastic component the result is a plastic portion which is provided with pores, for example in the form of a sealing bead.

If the mixing device is inactive over a prolonged period of time, gas which is already in the liquid issues from the mixing chamber through that seal which seals off the mixing chamber in the region of the shaft. When the mixing device is activated after the stoppage time, the mixture which is to be discharged by way of the discharge opening is provided with too little gas and an inadequate foaming process occurs.

SUMMARY OF THE INVENTION

The object of the invention is to provide a mixing device in which the above-described problems are avoided.

The gas which has issued from the mixing chamber through the seal passes on the side of the seal, that is remote from the mixing chamber, into the reservoir which is arranged there and is received by the liquid plastics component which is disposed there. When the mixing device is set in operation, again the liquid plastics component provided with the gas flows out of the reservoir by way of the line which connects the reservoir to the mixing chamber, into the mixing chamber again, and is there homogenized by the agitator device with the liquid plastics component which has too little gas.

BRIEF DESCRIPTION OF THE DRAWING

FIG. 1 shows a mixing device for mixing a liquid plastics component with a gas.

DETAILED DESCRIPTION OF THE INVENTION

As shown in FIG. 1, the mixing device 1 has at least one liquid feed 2, at least one gas feed 3, and a discharge opening 11 for discharging the mixture produced in the mixing device 1. The liquid feed 2, the gas feed 3, and the discharge opening 11 are respectively connected to a mixing chamber 4 in which a rotatable agitator device 5 is arranged. A shaft 6 for driving the agitator device 5 projects out of the mixing chamber 4. In the region of the shaft 6, the mixing chamber 4 is sealed off by at least one seal 7 which in the illustrated example is an annular seal. The gas feed 3 is provided in that region with a non-return valve.

If gas issues from the mixing chamber 4, in particular in a stoppage condition, the gas passes to the side 10 of the seal 7 remote from the mixing chamber. Disposed there is a reservoir 8 which is connected to the liquid feed 2 and which is filled with the liquid plastics component and which is delimited by the seal 7 or the side 10 thereof remote from the mixing chamber. That reservoir 8 is connected to the mixing chamber 4 by a line (passage) 9.

If substantially the same pressure prevails in the reservoir 8 and the mixing chamber 4, that reduces the rate at which gas issues from the mixing chamber 4 into the reservoir 8.

It is also possible to see in FIG. 1 two further annular seals 13 which delimit (define) or seal off the reservoir 8 with respect to the shaft 6.

A non-return valve 14 is arranged in the line 9. That valve 14 can exclude a massive backflow in the event of leakage in the region of the reservoir 8. In addition, the housing 16 of the mixing chamber 4 is surrounded by a cooling casing 12. The cooling casing 12 defines a cooling chamber 15 through which can flow a fluid for cooling the mixing chamber 4.

LIST OF REFERENCES 1 mixing device
2 liquid feed
3 gas feed
4 mixing chamber
5 agitator device
6 shaft
7 seal
8 reservoir
9 line
10 side of the seal 7, that is remote from the mixing chamber
11 discharge opening
12 cooling casing
13 further seal
14 non-return valve
15 cooling chamber
16 housing

The invention claimed is:

1. A mixing device for mixing a liquid plastics component with a gas, the mixing device comprising:
    a housing having a mixing chamber formed therein;
    a rotatable agitator device arranged in the mixing chamber, the agitator device having a shaft to be driven for rotating the agitator device;
    a liquid feed;
    a gas feed; and
    a discharge opening for discharging the mixture produced in the mixing device,
    wherein the liquid feed, the gas feed, and the discharge opening are each connected to the mixing chamber in which the rotatable agitator device is arranged,
    wherein the shaft for driving the agitator device projects out of the mixing chamber, and the mixing chamber is sealed off in a region of the shaft by a seal,
    wherein a reservoir is formed at a side of the seal remote from the mixing chamber such that the seal delimits the reservoir, the reservoir being connected to the liquid feed and being connected to the mixing chamber by a passage extending through the housing.

2. The mixing device as set forth in claim 1, wherein the seal has an annular configuration.

3. The mixing device as set forth in claim 1, wherein the seal is a first seal, the mixing device further comprising a second seal configured to seal off the reservoir with respect to the shaft.

4. The mixing device as set forth in claim 1, further comprising a non-return valve arranged in the passage.

5. The mixing device as set forth in claim 1, wherein the housing delimits the mixing chamber and is surrounded by a cooling casing, wherein the cooling casing delimits a cooling chamber configured to allow a fluid for cooling the mixing chamber to flow therethrough.

6. The mixing device as set forth in claim 3, wherein the second seal has an annular shape.

7. The mixing device as set forth in claim 4, wherein the non-return valve within the passage allows flow only from the reservoir towards the mixing chamber.

* * * * *